US011800331B2

(12) United States Patent
Lupper et al.

(10) Patent No.: US 11,800,331 B2
(45) Date of Patent: Oct. 24, 2023

(54) COMMUNICATION COMPONENT MANAGEMENT SYSTEM

(71) Applicant: CommScope Technologies LLC, Hickory, NC (US)

(72) Inventors: Alfred Josef Lupper, Aystetten (DE); Arndt Paul Pischke, Huisheim (DE); Gerhard Braun, Ederheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/048,658

(22) PCT Filed: Apr. 15, 2019

(86) PCT No.: PCT/US2019/027483
§ 371 (c)(1),
(2) Date: Oct. 19, 2020

(87) PCT Pub. No.: WO2019/204205
PCT Pub. Date: Oct. 24, 2019

(65) Prior Publication Data
US 2021/0368309 A1  Nov. 25, 2021

Related U.S. Application Data

(60) Provisional application No. 62/660,137, filed on Apr. 19, 2018.

(51) Int. Cl.
*H04W 4/38* (2018.01)
*H04W 4/33* (2018.01)
(Continued)

(52) U.S. Cl.
CPC ............. *H04W 4/38* (2018.02); *H04L 67/125* (2013.01); *H04W 4/33* (2018.02); *H04W 4/70* (2018.02)

(58) Field of Classification Search
CPC ........... H04W 4/38; H04W 4/33; H04W 4/70; H04L 67/125
(Continued)

(56) References Cited

U.S. PATENT DOCUMENTS 6,441,723 B1 *  8/2002  Mansfield, Jr. .......... H04B 3/54
                                                          340/538.14
9,953,496 B2 *  4/2018  Westman ............... G08B 13/08
(Continued)

FOREIGN PATENT DOCUMENTS

EP          2180605 A1      4/2010

OTHER PUBLICATIONS

International Searching Authority, "International Search Report and Written Opinion from PCT Application No. PCT/US2019/027483", dated Aug. 7, 2019, pp. 1 through 15, Published: WO.
(Continued)

*Primary Examiner* — Omar Casillashernandez
(74) *Attorney, Agent, or Firm* — Fogg & Powers LLC

(57) ABSTRACT

A distributed antenna system (DAS) having a communication component management system is provided that includes at least one communication component, at least one building sensor and at least one controller. The at least one communication component is used to establish a communication link between user equipment within an area of a building and the DAS. The at least one building sensor is located to sense environmental conditions within the building as part of a building control management system. The at least one controller is in communication with the at least one communication component. The at least one controller is further communicatively coupled to receive sensor data from the at least one building sensor. The at least one controller is configured to selectively change an operation state of the at least one communication component based at
(Continued)

least in part on received sensor data from the at least one building sensor.

25 Claims, 7 Drawing Sheets

(51) Int. Cl.
*H04L 67/125* (2022.01)
*H04W 4/70* (2018.01)

(58) Field of Classification Search
USPC .......................................................... 340/4.3
See application file for complete search history.

(56) References Cited

U.S. PATENT DOCUMENTS

| | | | |
|---|---|---|---|
| 11,322,969 B2* | 5/2022 | Stein | H04B 7/0617 |
| 2012/0293390 A1 | 11/2012 | Shoemaker et al. | |
| 2013/0288692 A1 | 10/2013 | Dupray et al. | |
| 2014/0089243 A1* | 3/2014 | Oppenheimer | G06F 11/3419 |
| | | | 706/46 |
| 2014/0233442 A1* | 8/2014 | Atias | H04W 52/0254 |
| | | | 370/311 |
| 2015/0119079 A1* | 4/2015 | Tarlazzi | H04W 64/00 |
| | | | 455/456.1 |
| 2015/0131520 A1* | 5/2015 | Kummetz | H04W 72/0473 |
| | | | 370/315 |
| 2017/0039828 A1* | 2/2017 | McAllister | H04B 7/04 |
| 2017/0079039 A1 | 3/2017 | Gerszberg et al. | |
| 2017/0265124 A1* | 9/2017 | Seemann | H04W 4/80 |
| 2019/0036964 A1* | 1/2019 | Lev | H04L 63/1416 |
| 2019/0190978 A1* | 6/2019 | Brown | B65G 43/10 |
| 2020/0044876 A1* | 2/2020 | Piccolo, III | H04W 4/33 |
| 2020/0118403 A1* | 4/2020 | Poy | G01C 21/206 |

OTHER PUBLICATIONS

International Bureau, "International Preliminary Report on Patentability from PCT Application No. PCT/US2019/027483", from Foreign Counterpart to U.S. Appl. No. 17/048,658, dated Oct. 29, 2020, pp. 1 through 9, Published: WO.

European Patent Office, "Extended European Search Report from EP Application No. 19787647.7", dated Dec. 8, 2021, from Foreign Counterpart to U.S. Appl. No. 17/048,658, pp. 1 through 15, Published: EP.

European Patent Office, "Communication pursuant to Article 94(3)", from EP Application No. 19787647.7, from Foreign Counterpart to U.S. Appl. No. 17/048,658, dated Sep. 8, 2023, pp, 1 through 10, Published: EP

* cited by examiner

COMMUNICATION COMPONENT MANAGEMENT SYSTEM

CROSS-REFERENCE TO RELATED APPLICATIONS

This Application claims priority to International Application No. PCT/US2019/027483, same title herewith, filed on Apr. 15, 2019, which claims priority to U.S. Provisional Application Ser. No. 62/660,137, same title herewith, filed on Apr. 19, 2018, the contents of both of which are incorporated in their entirety herein by reference.

BACKGROUND

Wireless cellular service providers use base stations to implement wireless communication links with user equipment, such as mobile phones. In particular, a base station is typically in communication with one or more antennas that receive and transmit radio frequency signals to and from user equipment. Each base station in turn is in communication with the service provider's core network. The coverage area of a base station is limited by the transmit power of the associated signals. Moreover, the coverage provided by the transmitted signals is influenced by many other factors such as physical obstacles and interference. Hence, wireless coverage in buildings and stadiums has been traditionally poor when served only from conventional "macro" base stations.

One way that a wireless cellular service provider can improve the coverage provided by a given base station or group of base stations is by using a distributed antenna system (DAS). In a typical DAS, radio frequency (RF) signals are transported between a master unit and one or more remote antenna units using one or more transport cables. The master unit is communicatively coupled to one or more base stations.

Traditionally, RF signals transmitted from the base stations (also referred to here as "downlink RF signals") are received at the master unit. The master unit uses the downlink RF signals to generate one or more downlink transport signals that are distributed to one or more of the remote antenna units over the transport cables. Each such remote antenna unit receives a downlink transport signal and generates a version of the downlink RF signals based on the downlink transport signal and causes the generated downlink RF signals to be radiated from at least one antenna coupled to or included in that remote antenna unit. A similar process is performed in the uplink direction. RF signals transmitted are from user equipment (also referred to here as "uplink RF signals"). Each such uplink RF signal is intended for a base station coupled to the master unit. Each remote antenna unit receives uplink RF signals transmitted from user equipment within its associated coverage area.

Each remote antenna unit uses the received uplink RF signals to generate an uplink transport signal that is transmitted from the remote antenna unit to the master unit. The master unit receives uplink transport signals from the various remote antenna units coupled to it. For each base station coupled to the master unit, the master unit combines uplink signals intended for that base station that are received from the various remote antenna units.

For each base station coupled to the master unit, the master unit ultimately generates uplink RF signals from the combined uplink signals for that base station, which are provided to that base station. Each remote antenna unit can be coupled to each master unit either directly or indirectly via one or more intermediate devices (such as another remote antenna unit or an expansion unit). In this way, the coverage of each base station can be expanded using the DAS.

SUMMARY

The following summary is made by way of example and not by way of limitation. It is merely provided to aid the reader in understanding some of the aspects of the subject matter described. Some embodiments provide a system that uses building sensors to gather sensor information that is used at least in part by a communication system to control an operational state of communication coverage equipment that is located to provide communication coverage services within areas of a building for user equipment.

In one embodiment, a communication component management system is provided that includes at least one communication component, at least one building sensor and at least one controller. The at least one communication component is used to establish a communication link between user equipment within an area of a building and a distributed antenna system (DAS). The at least one building sensor is located to sense environmental conditions within the building as part of a building control management system. The at least one building sensor is positioned a select distance from the at least one communication component of the DAS. The at least one controller is in communication with the at least one communication component. The at least one controller is further communicatively coupled to receive sensor data from the at least one building sensor. The at least one controller is configured to selectively change an operation state of the at least one communication component based at least in part on received sensor data from the at least one building sensor.

In another example embodiment, another distributed antenna system (DAS) having a communication component management system is provided. The DAS includes at least one base station, at least one master unit, a plurality of communication components, a plurality of building sensors and at least one controller. The at least one base station is in communication with a service provider network. The at least one master unit is in communication with the at least one base station to at least in part route communication signals. Each communication component is positioned to provide communication services to a select coverage area within a building. The plurality of communication components are in communication with the at least one master unit. Each building sensor is positioned to generate sensor data relating to a select sensor area of the building as part of a building control management system. The at least one controller is in communication with the plurality of communication components. The at least one controller is further communicatively coupled to receive sensor data from the plurality of building sensors. The at least one controller is configured to selectively change an operation state of at least one of the plurality of communication components based at least in part on received sensor data from at least one of the building sensors.

In yet another embodiment, a method of managing reconfigurable communication components in a distributed antenna system (DAS) is provided. The method includes receiving sensor data from at least one building sensor that is part of a building control management system that is positioned to sense environmental conditions within a select area of a building. It is determined if the sensor data from the at least one building sensor requires a change in an operating state of at least one communication component providing communication services to the select area of the building is needed. When a change of operation of at least one communication component is determined, the operating state of the at least one communication component providing communication services to the select area of the building is changed.

In still another embodiment, a method of controlling environmental states in an area is provided. The method includes monitoring for uplink radiation with a distributed antenna system (DAS). Upon detection of uplink radiation in an area covered by the DAS, detection and location information is communicated to a building controller that controls environmental conditions associated with the area covered by the DAS. The environmental conditions associated with the area is controlled with the building controller based on the communicated detection and location information.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Some embodiments use sensor data from sensors monitoring conditions within a building to control the operation of communication components of a distributed antenna system (DAS) that provide service coverage within the building. The communication devices may include RF equipment used to communicate between user equipment and the DAS. Using sensor data in this way can provide a dynamic system that optimizes the communication component configurations based on environmental conditions and differing situations. For example, in certain situations, a communication component may be put in a passive operation state (turned off) when sensor data indicates the communication component is not needed. Benefits of this include the use of less RF radiation (pollution), energy savings and extending the life of a communication component since it is only fully powered when needed. Moreover, by shutting down the communication components, such as but not limited to, remote units in areas without users, remote units in idle areas picking up noise from interferers can be avoided. This helps reduce the noise floor on the uplink at base stations. In another example situation, the sensor data may indicate a public safety issue present and the operational state of one or more communication components may be activated to create a redundant system.

Figure 1A:
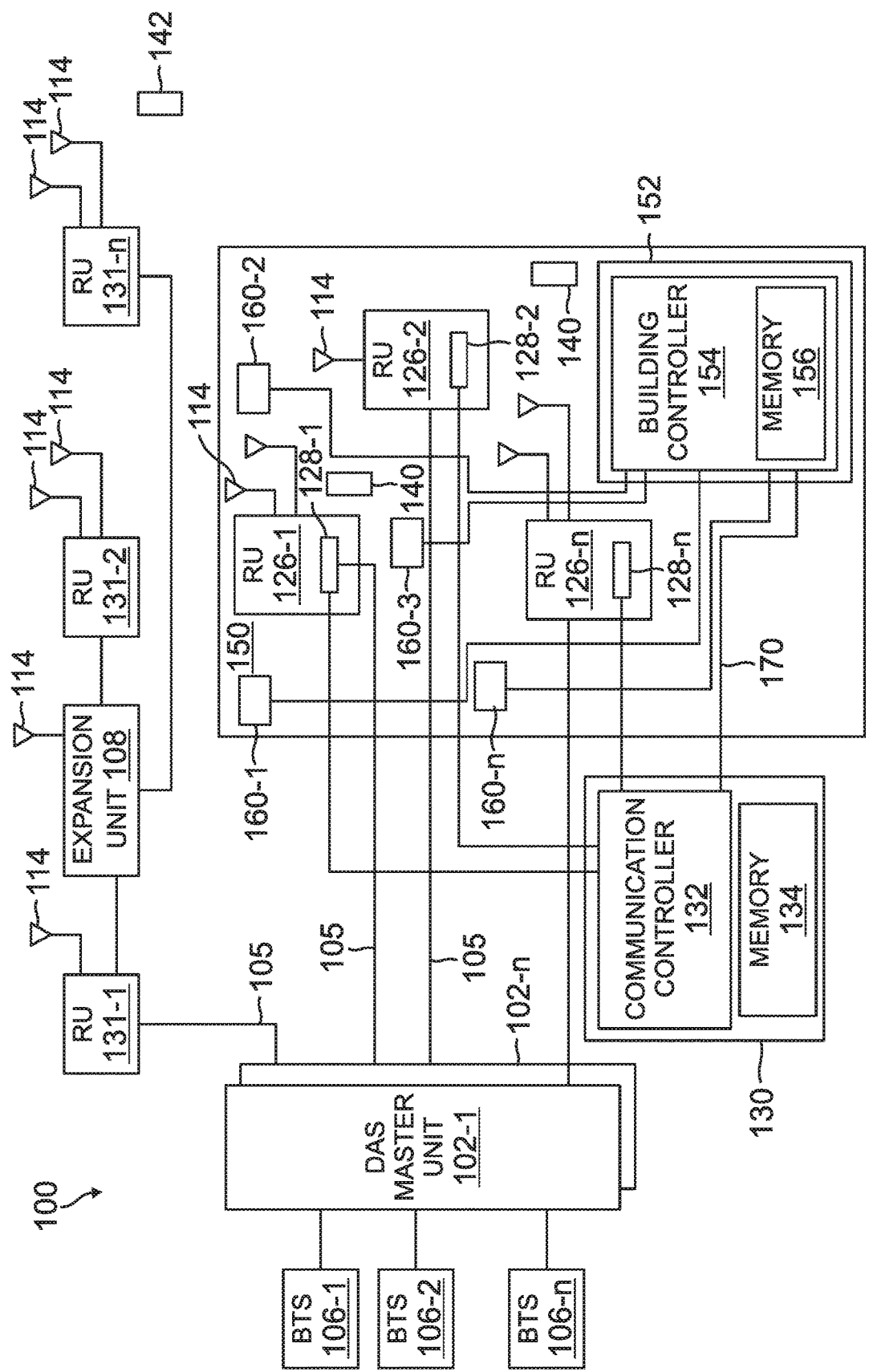
FIG. 1A illustrates one exemplary embodiment of a distributed antenna system having a communication component management system.

FIG. 1A illustrates one example embodiment of a DAS 100 having a communication component management system. DAS 100 comprises one or more master units 102-1 through 102-n (generally referenced as master units 102) that are communicatively coupled to one or more remote antenna units 126-1 through 126-n and 131-1 through 131-n (generally referenced by remote antenna units 126 and 131) via one or more communication links 105. Each remote antenna unit 126 and 131 may be communicatively coupled directly to one or more of the master units 102 or indirectly via one or more other remote antenna units 126 and 131 and/or via one or more expansion (or other intermediary) such as expansion unit 108. As illustrated in the example of FIG. 1, remote antenna units 131-2 and 131-n are in communication with the master unit 102 via expansion unit 108 and remote antenna unit 131-1.

Each master unit 102 is communicatively coupled to one or more base stations 106-1 through 106-n (generally indicated as 106). One or more of the base stations 106 can be co-located with the respective master units 102 to which they are coupled (for example, where each base station 106 is dedicated to providing base station capacity to the system 100 and is coupled to the respective master units 102). Also, one or more of the base stations 106 may be located remotely from the respective master units 102 to which it is coupled (for example, where the base station 106 provides base station capacity to an area beyond the coverage area of the DAS 100). In this latter case, the master unit 102 may be coupled to a donor antenna and repeater or bi-directional amplifier in order to wirelessly communicate with the remotely located base station 106.

The base stations 106 can also be coupled to the master units 102 using a network of attenuators, combiners, splitters, amplifiers, filters, cross-connects, etc., (sometimes referred to collectively as a "point-of-interface" or "POI"). This network can be included in the master units 102 and/or can be separate from the master units 102. This is done so that, in the downlink, the desired set of RF channels output by the base stations 106 can be extracted, combined, and routed to the appropriate master units 102, and so that, in the upstream, the desired set of carriers output by the master units 102 can be extracted, combined, and routed to the appropriate interface of each base station 106. It is to be understood, however, that this is one example and that other embodiments can be implemented in other ways.

In general, each master unit 102 comprises downlink DAS circuitry that is configured to receive one or more downlink signals from one or more base stations 106. Each base station downlink signal includes one or more radio frequency channels used for communicating in the downlink direction with user equipment 140, 142 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol).

The downlink DAS circuitry in each master unit 102 is also configured to generate one or more downlink transport signals derived from one or more base station downlink signals and to transmit one or more downlink transport signals to one or more of the remote antenna units 126 and 131.

Each remote antenna unit 126 and 131 comprises downlink DAS circuitry that is configured to receive the downlink transport signals transmitted to it from one or more master units 102 and to use the received downlink transport signals to generate one or more downlink radio frequency signals that are radiated from one or more coverage antennas 114 associated with that remote antenna unit 126 and 131 for reception by user equipment 140 and 142. In this way, the DAS 100 increases the coverage area for the downlink capacity provided by the base stations 106.

Also, each remote antenna unit 126 and 131 comprises uplink DAS circuitry that is configured to receive one or more uplink radio frequency signals transmitted from the user equipment 140 and 142. These signals are analog radio frequency signals.

The uplink DAS circuitry in each remote antenna unit 126 and 131 is also configured to generate one or more uplink transport signals derived from the one or more remote uplink radio frequency signals and to transmit one or more uplink transport signals to one or more of the master units 102.

Each master unit 102 comprises uplink DAS circuitry that is configured to receive the respective uplink transport signals transmitted to it from one or more remote antenna units 404 and to use the received uplink transport signals to generate one or more base station uplink radio frequency signals that are provided to the one or more base stations 106 associated with that master unit 102. Typically, this involves, among other things, combining or summing uplink signals received from multiple remote antenna units 126 and 131 in order to produce the base station signal provided to each base station 106. In this way, the DAS 100 increases the coverage area for the uplink capacity provided by the base stations 106.

Each expansion unit 108 comprises downlink DAS circuitry that is configured to receive the downlink transport signals transmitted to it from the master unit 102 (or other expansion unit 108) and transmits the downlink transport signals to one or more remote antenna units 131 or other downstream expansion units 108. Each expansion unit 108 also comprises uplink DAS circuitry that is configured to receive the respective uplink transport signals transmitted to it from one or more remote antenna units 131 or other downstream expansion units 108, combine or sum the received uplink transport signals, and transmit the combined uplink transport signals upstream to the master unit 102 or other expansion unit 108.

In other embodiments, one or more remote antenna units 126 and 131 are coupled to one or more master units 102 via one or more other remote antenna units 126 and 131 (for examples, where the remote antenna units 126 and 131 are coupled together in a daisy chain or ring topology).

The downlink DAS circuitry and uplink DAS circuitry in each master unit 102, remote antenna unit 126 and 131, and expansion unit 108, respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry and uplink DAS circuitry may share common circuitry and/or components.

The DAS 100 can use digital transport, analog transport, or combinations of digital and analog transport for generating and communicating the transport signals between the master units 102, the remote antenna units 126 and 131, and any expansion units 108.

As noted above, downlink and uplink transport signals are distributed by the DAS 100 between the master units 102 and the remote antenna units 126 and 131 in order to transport radio frequency that are wirelessly communicated between the base stations 106 and the user equipment 140 and 142. In addition to these downlink and uplink transport signals, the DAS 100 is configured to also communicate one or more overhead channels. These overhead channels can be used to communicate operations, administration, and management data among the various units of the DAS 100. These overhead channels can also be used to communicate "pass through" data such as Ethernet or IP frames or packets. For example, an Ethernet switch, hub, router, gateway or other inter-networking device can be coupled to an Ethernet interface included in a master unit 102 and one or more devices (such as a WiFi access point, small-cell or femto base station, laptop, tablet, IP security camera, sensor, and/or sensor or IOT gateway) can be coupled to an Ethernet interface included in a remote antenna unit 126 and 131 or expansion unit 108. Also, power can be supplied to such devices via the remote antenna unit 126 and 131 or expansion unit 108 (for example, using Power over Ethernet power forwarding).

In the DAS 100 in this example embodiment, DAS equipment that includes remote antenna units 126 and associated antennas 114 are located in building 150. The antennas 114 provide a communication link between user equipment 140 in the building 150 and the DAS system.

Building 150 as described herein may include any type of structure(s) or area. Generally it refers to an area providing communication coverage by the DAS 100. For example, a building 150 may include a building, a plurality of buildings, groups of buildings in "smart cities," plazas, tunnels, flat structures such as roads, concrete structures, below ground structures such as basements as well as moving structures such as ships and trains.

The DAS 100 can also include one or more sensors that are collocated with one or more units of the DAS 100. Further in the example embodiment of FIG. 1, at least one of the remote antenna units 126 includes a collocated sensor 128-1 through 128-*n* (generally referenced by 128). The sensors 128 may be at least one of a light intensity sensor, image sensor, an audio sensor, a movement sensor, an acceleration sensor, a position sensor, smoke detector sensor, fire detector sensor, a gunshot detector, a gas detector, a water sensor, a humidity sensor, temperature sensor, etc. Sensors 128 provide sensor data to a communication controller system 130 (such as a server) that at least includes a communication controller 132 (communication processor) and a communication memory 134. The sensors 128 can communicate the sensor data to the communication controller 132 using the communication links provided by the DAS 100. More specifically, the sensor data can be communicated via one or more of the overhead channels provided over the transport cabling used in the DAS 100. For example, the sensor data can be communicated as pass through Ethernet or IP data. The sensor data can be communicated in other ways (for example, using proprietary protocols or wireless protocols such as Z-wave, Zigbee, etc.).

In general, the communication controller 132 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the communication controller 132 herein may be embodied as software, firmware, hardware or any combination thereof. The communication controller 132 may be part of a system controller of the DAS 100 or a component controller of the DAS. The communication controller system 130 may be located in any portion of the DAS 100 including one of the DAS master units 102 or it may be at a remote location. Further the controller may be part of server in a control center that is located within the building or remote from the building.

The communication memory 134 may include computer-readable operating instructions that, when executed by the communication controller 132 provides functions of the DAS 100. Such functions may include the functions of routing communication signals and the operation of remote antenna units 126 described below. The instructions may include operating parameters of the communication components based at least in part on received sensor data. The memory 134 may store sensor data. The computer readable instructions may be encoded within the communication memory 132. Communication memory 134 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

In an embodiment, the communication controller 130 is configured to control operating parameters (or operation states) of communication components servicing the building (including the remote antenna units 126, antennas 114, expansion units 108, etc.) based at least in part on sensor data provided by the sensors 128 collocated with units of the DAS 100. For example, the sensor data may include information that no motion has been detected near an associated remote antenna unit 126 or no light has been detected near the remote antenna unit 126. This type of sensor data may indicate that there is no user equipment 140, 142 near the remote antenna unit 126. In this scenario, the communication controller 132 implementing logic features, may turn off associated remote antenna units 126. In another example, if the sensor information indicates there is a fire at or near the associated unit of the DAS 100, the communication controller 132 may switch on or activate certain communication components such as remote antenna units 126 in order to provide RF coverage for first responders. Further, in this scenario, the communication controller 132 may switch the DAS 100 into a public safety redundancy mode providing redundant communication links for the first responders.

FIG. 1A further illustrates a plurality of building sensors 160-1 through 160-n (generally referenced by 160) that make up a separate IOT sensor infrastructure that are part of a building control management system. The building sensors 160 may include light intensity sensors, image sensors, audio sensors, movement sensors, acceleration sensors, position sensors, smoke detector sensors, fire detector sensors, gunshot detectors, gas detectors, water sensor, humidity sensors, temperature sensors, pressure sensors, radio sensors, radio frequency sensors and sensors for the detection of explosions etc. The sensors 160 may be used to detect lighting, heating, cooling, terror attacks, detection of explosives, panic of crowds, gun shots, fire, flooding, time, and intensity of uplink radio signals from user equipment, panic, aggressive and/or otherwise violent behavior in individuals and crowds etc. Sensors 160 may include processing functions in some embodiments. For example, sensors 160 that sense panic, aggressive and/or otherwise violent behavior may include a processor that implements software and/or firmware instructions to analyze sensed data in determining if panic, aggressive and otherwise violet behavior has been detected. The sensed data may include audio, visual, pressure and as well as other types of sensed data.

The building control management system includes a building system controller system 152 (such as a server) that includes a building controller 154 and building system memory 156. The building system controller system 152 may control building systems such as, but not limited to, lights, temperature, alarms, fire suppression, etc. based on received sensor data from the building sensors 160.

The building system controller system 152 may include any one or more of a processor, microprocessor, a digital signal processor (DSP), an application specific integrated circuit (ASIC), a field program gate array (FPGA), or equivalent discrete or integrated logic circuitry. In some example embodiments, the building system controller system 152 may include multiple components, such as any combination of one or more microprocessors, one or more controllers, one or more DSPs, one or more ASICs, one or more FPGAs, as well as other discrete or integrated logic circuitry. The building system memory 156 includes computer readable instructions or features that are executed by the building controller 154. Building system memory 156 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

In one embodiment, the building controller 154 is in communication with the communication controller 132 via communication link 170. In this embodiment, the building system controller 154 conveys sensor information from building sensors 160 to the communication controller 132. The communication controller 132 then uses building sensor information in determining operations of the communication components in the building 150. In embodiments, the communication controller 132 may use one or both the building sensors 160 and the remote antenna unit sensors 128 in determining operations of the communication components, such as the remote units 126 and antennas 114 providing communication services within the building 150.

Figure 1B:
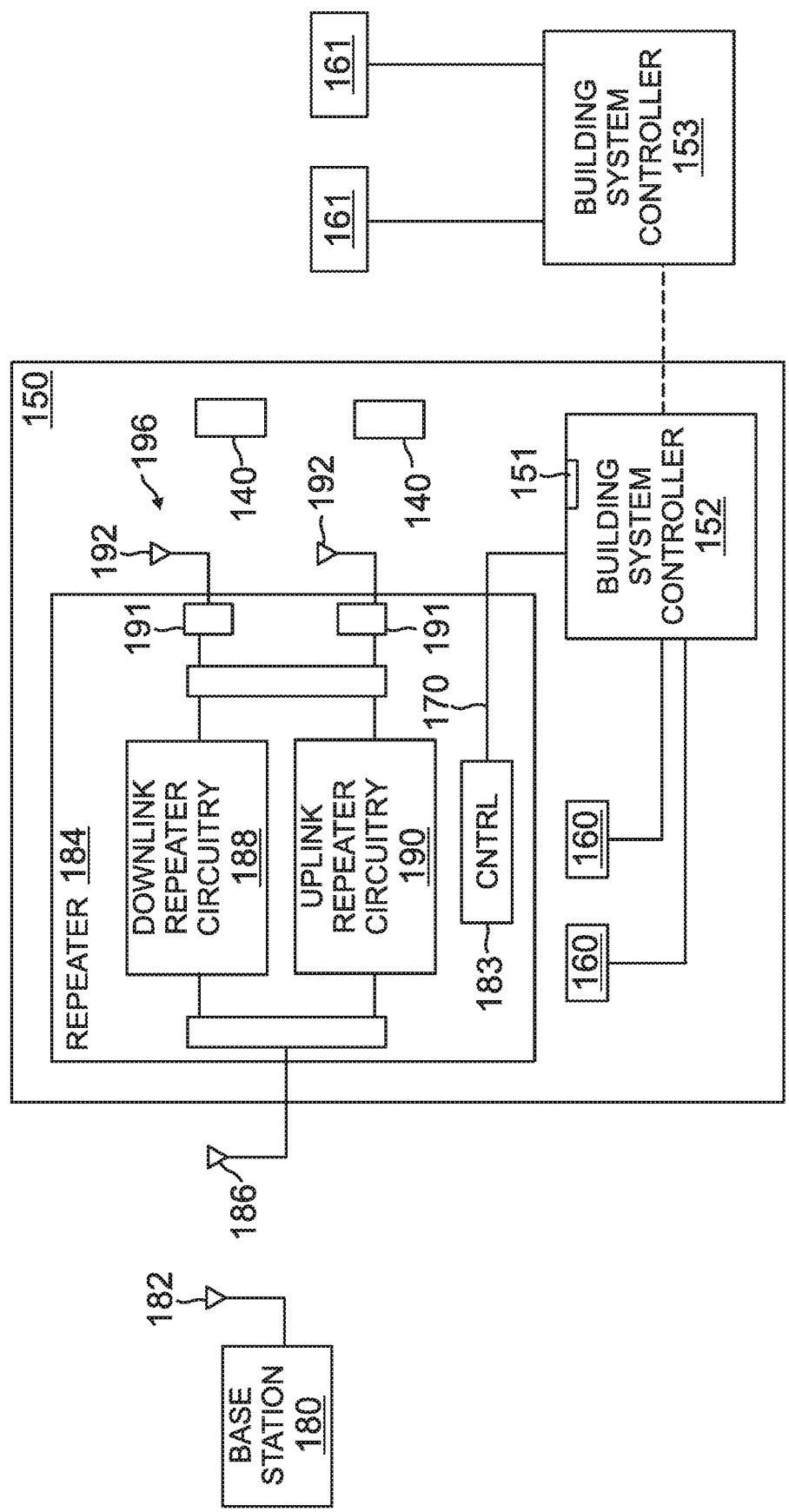
FIG. 1B illustrates an exemplary embodiment of a repeater system having a communication management system.

Other types of repeater systems besides the DAS 100 described above may be used with a communication management system of embodiments. FIG. 1B illustrates a block diagram of one embodiment of a single-node repeater 184 in which a communication management system described herein is implemented. In embodiments, at least one repeater 184 is positioned to provide wireless coverage for building 150.

The single-node repeater 184 comprises downlink repeater circuitry 188 that is configured to receive one or more downlink signals from one or more base stations 180 via antennas 182 and 186 respectfully. These signals are also referred to here as "base station downlink signals." Each base station downlink signal includes one or more radio frequency channels used for communicating in the downlink direction with user equipment (UE) 140 over the relevant wireless air interface. Typically, each base station downlink signal is received as an analog radio frequency signal.

The downlink repeater circuitry 188 in the single-node repeater 184 is also configured to generate one or more downlink radio frequency signals that are radiated from one or more antennas 192 associated with the single-node repeater 184 for reception by user equipment 140. These downlink radio frequency signals are analog radio frequency signals and are also referred to here as "repeated downlink radio frequency signals." Each repeated downlink radio frequency signal includes one or more of the downlink radio frequency channels used for communicating with user equipment 140 over the wireless air interface. In this exemplary embodiment, the single-node repeater 184 is an active repeater system in which the downlink repeater circuitry 188 comprises one or more amplifiers (or other gain elements) that are used to control and adjust the gain of the repeated downlink radio frequency signals radiated from the one or more antennas 192.

Also, the single-node repeater 184 comprises uplink repeater circuitry 190 that is configured to receive one or more uplink radio frequency signals transmitted from the user equipment 140. These signals are analog radio frequency signals and are also referred to here as "UE uplink radio frequency signals." Each UE uplink radio frequency signal includes one or more radio frequency channels used for communicating in the uplink direction with user equipment 140 over the relevant wireless air interface.

The uplink repeater circuitry 190 in the single-node repeater 184 is also configured to generate one or more uplink radio frequency signals that are provided to the one or more base stations 180. These signals are also referred to here as "repeated uplink signals." Each repeated uplink signal includes one or more of the uplink radio frequency channels used for communicating with user equipment 140 over the wireless air interface. The single-node repeater 184 may be an active repeater system in which the uplink repeater circuitry 190 comprises one or more amplifiers (or other gain elements) that are used to control and adjust the gain of the repeated uplink radio frequency signals provided to the one or more base stations 180. Typically, each repeated uplink signal is provided to the one or more base stations 180 as an analog radio frequency signal. The uplink repeater circuitry 190 may include at least one receiver front end which e.g. amplifies received uplink radio frequency signals.

The downlink repeater circuitry 188 and uplink repeater circuitry 190 can comprise one or more appropriate connectors, attenuators, combiners, splitters, amplifiers, filters, diplexers, duplexers, transmit/receive switches, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink repeater circuitry 188 and uplink repeater circuitry 190 may share common circuitry and/or components.

A combination of two or more diplexers, duplexers, transmit / receive switches duplexers and/or other combiner systems can be used to couple the downlink repeater circuitry 188 and the uplink repeater circuitry 190 to one or more antennas 315. The single-node repeater system 184 also comprises a communication controller (CNTRL) 183. The controller 183 is implemented using one or more programmable processors that execute software that is configured to implement the various control functions. The controller 183 (more specifically, the various control functions implemented by the controller 183) (or portions thereof) can be implemented in other ways (for example, in a field programmable gate array (FPGA), application specific integrated circuit (ASIC), etc.).

In an embodiment, the antennas 192 may be part of an antenna array 196. Further in embodiments the antenna or antennas directions may be manipulated based on sensor data received from one or more sensors 160 or 128. In these embodiments, the communication components include antenna manipulation components 191 to enable direction, directivity and beam width control of the antennas 192 and antenna arrays 196.

Further in some embodiments the communication components such as, but not limited to, the remote antenna units 131, the expansion units 108 of FIG. 1A and the repeater 184 in FIG. 1B include at least one of analog relay switching and digital analog switching used for signal routing. The respective communication controller 132 and 183 may control the switching based on sensor data.

The building system controller 152 may be in communication with other building or area system controllers 153. In this example embodiment, the building system controller 152 passes on sensor information from sensors 161 covering areas associated with the other building system controller(s) 153. The communication controller 183 may then use this additional information to change the operational state of associated communication components such as, but not limited to, repeater 150 in FIG. 1B. An example of where this arrangement may be useful is where a large crowd of people is moving from one area to another. In this situation, the other building system controller 153 can forward on the other sensor data 161 so the communication controller 183 of FIG. 1B, or communication controller 132 in the embodiment of FIG. 1A, can prepare for an additional demand that will be needed when the crowd arrives at building 150.

In one embodiment, the building system controller 152 includes an operator input 151. In this embodiment, building system controller 152 allows a person or a group of persons that monitor signals from the sensors 160 and to send and receive data to the communication controller 132 or 183. Hence, in this embodiment the building system controller 152 allows a manual reporting of sensor data to the communication controller 183. Further in an embodiment, the operator input 151 may be used to input operator observed conditions such the direct observation of a fire, crowds, aggressive behavior, violent behavior, panic etc. These observed conditions along with sensor data is forwarded on the respective communication controller 183.

Figure 2:
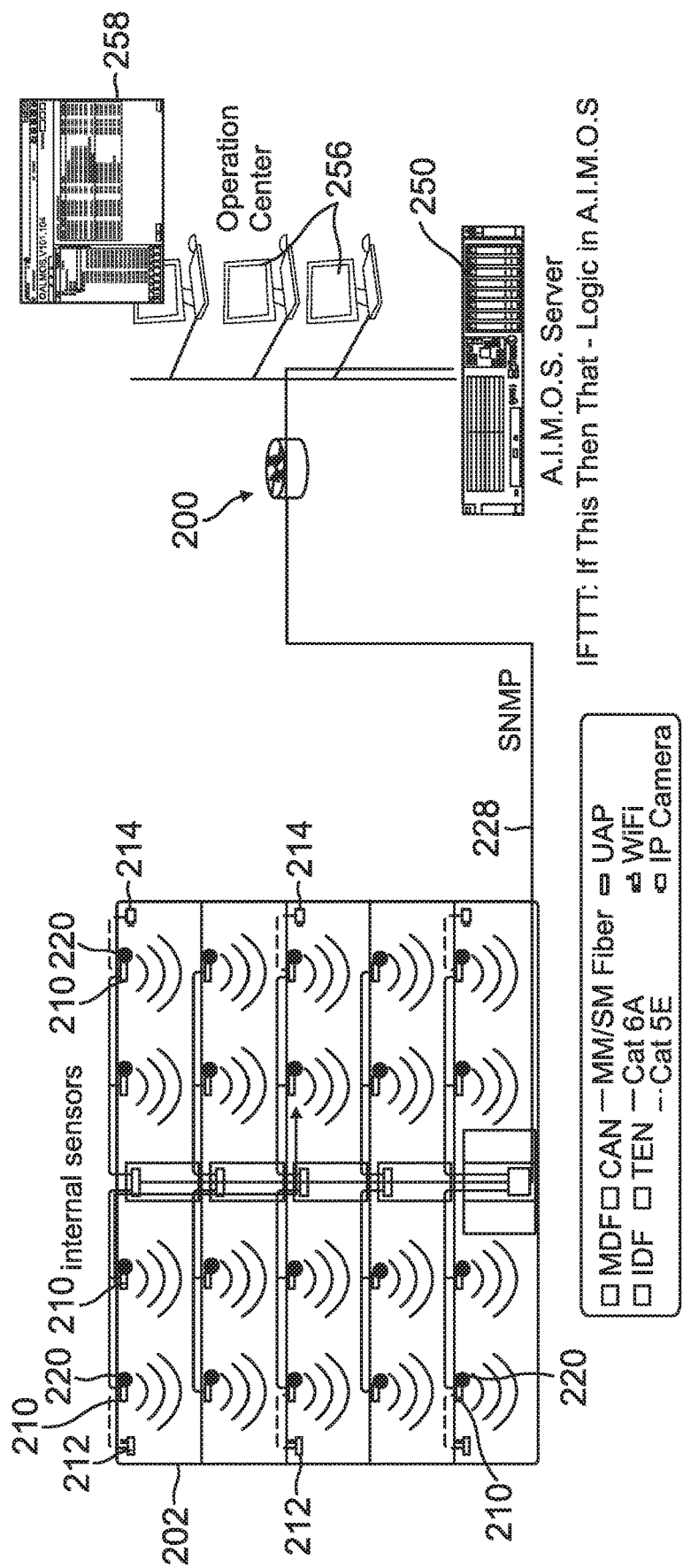
FIG. 2 illustrates one exemplary embodiment of a network management system for a distributed antenna system with collocated sensors.

FIG. 2 illustrates an example of a network management system (NMS) 200 for a DAS. Illustrated in FIG. 2 is a building 202 with a plurality of communication components 210. The DAS communication components 210 may include RF equipment such as remote antenna units, expansion units, antennas and the like, as well as WiFi access points, small cell base stations, single radio access point, etc. The communication components 210 are used to provide communication services in areas throughout the building 202. The communication services provided include creating communication links between user equipment, such as user equipment 140 discussed above, and the DAS. In this example embodiment, the communication components 210 include collocated sensors 220 similar to sensor 128 in remote antenna units 126 discussed above. Also illustrated in building 202 is other equipment, such as wireless local area network access point (also referred to here as a "WiFi access point") 212 and IP camera 214 which are also coupled to provide data to the NMS 200.

In this example embodiment, sensor data from the sensors 220 are provided to the NMS 200 using a suitable protocol (such as the Simple Network Management Protocol (SNMP), Simple Object Access Protocol (SOAP), REpresentational State Transfer (REST), and the like) and communication link 228 that is used for alarms of the communication components 210. Sensor data is provided to a controller 250 (server) via communication link 228. Input/output devices 256 (such as work stations) including display screens 258 in an operating center are in communication with the server 250. This allows for a technician to monitor and modify the system if needed. The server 250 may implement If This Then That (IFTTT) logic instructions on the sensor data to determine if configurations of the communication components 210 should be modified. In some embodiments, time and location information associated with sensor data plus current system time and other system states may be considered as well when implementing the IFTTT logic instructions. Further in an embodiment, historical sensor data information associated with a specific sensor is associated with sensor data generated from the sensor and stored in memory, such as memory 134 discussed above. In this embodiment, the historical sensor data information may be used to predict trends which may be based on an algorithm and are used to determine if an associated communication component 210 needs an operational change.

Figure 3:
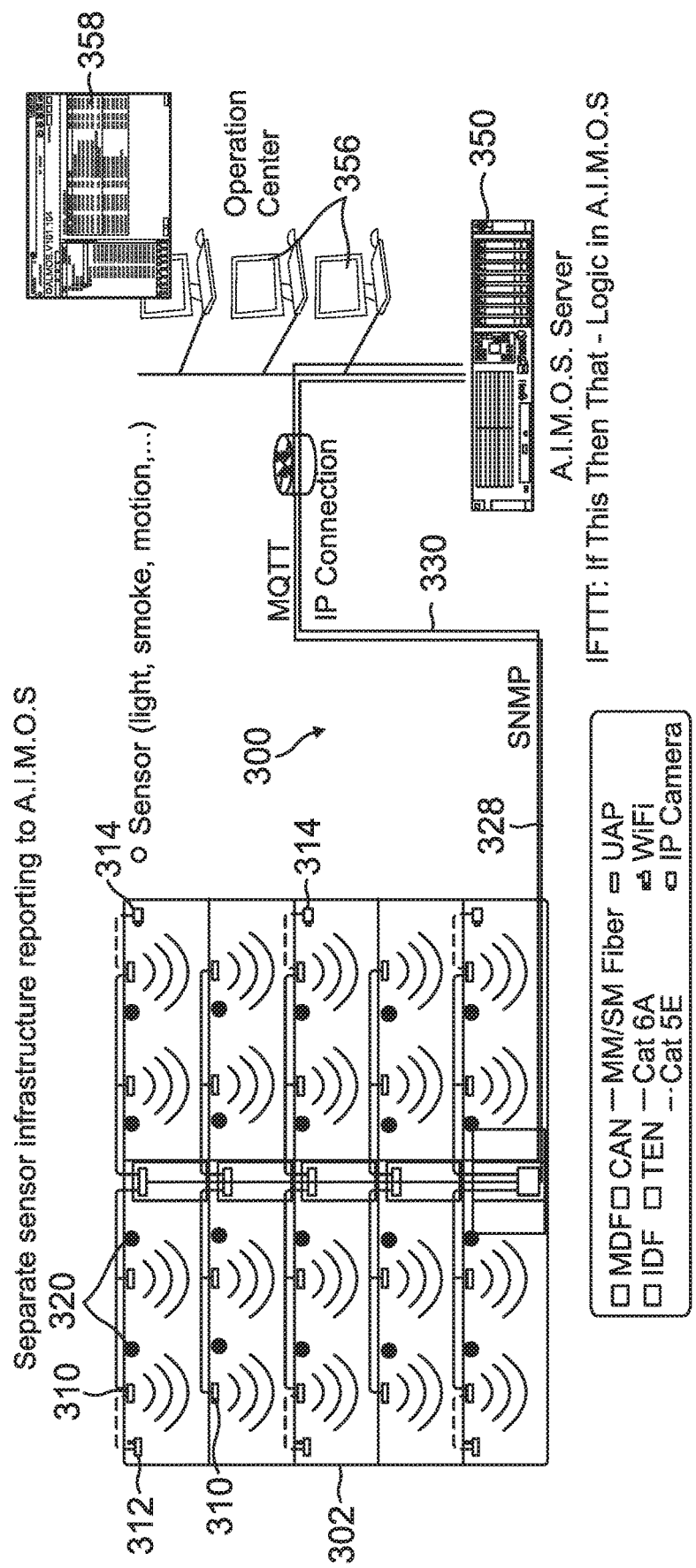
FIG. 3 illustrates one exemplary embodiment of a network management system for a distributed antenna system with building sensors.

FIG. 3 illustrates another embodiment of a NMS 300 for a DAS. In this example embodiment, building sensors 320 are not collocated with the communication components 310. The building sensors 320 of this embodiment have a separate infrastructure that provides the sensor data to the controller 350 (server) of the NMS 300 via separate communication link 330 and with a different communication protocol, such as, but not limited to, an Internet Of Thing (IOT) messaging protocol such as Message Queuing Telemetry Transport (MQTT). The communication components 310, as well as the WiFi access point 312 and IP cameras 314 are in communication with the server 350 via communication link 328. In an embodiment, SNMP is used through communication link 328 between the communication components 310 and the controller 350. The NMS 300 may combine the sensor data with alarms of the system as well as location and time information in determining if the operating parameters of a specific communication components 310 should be modified.

Figure 4:
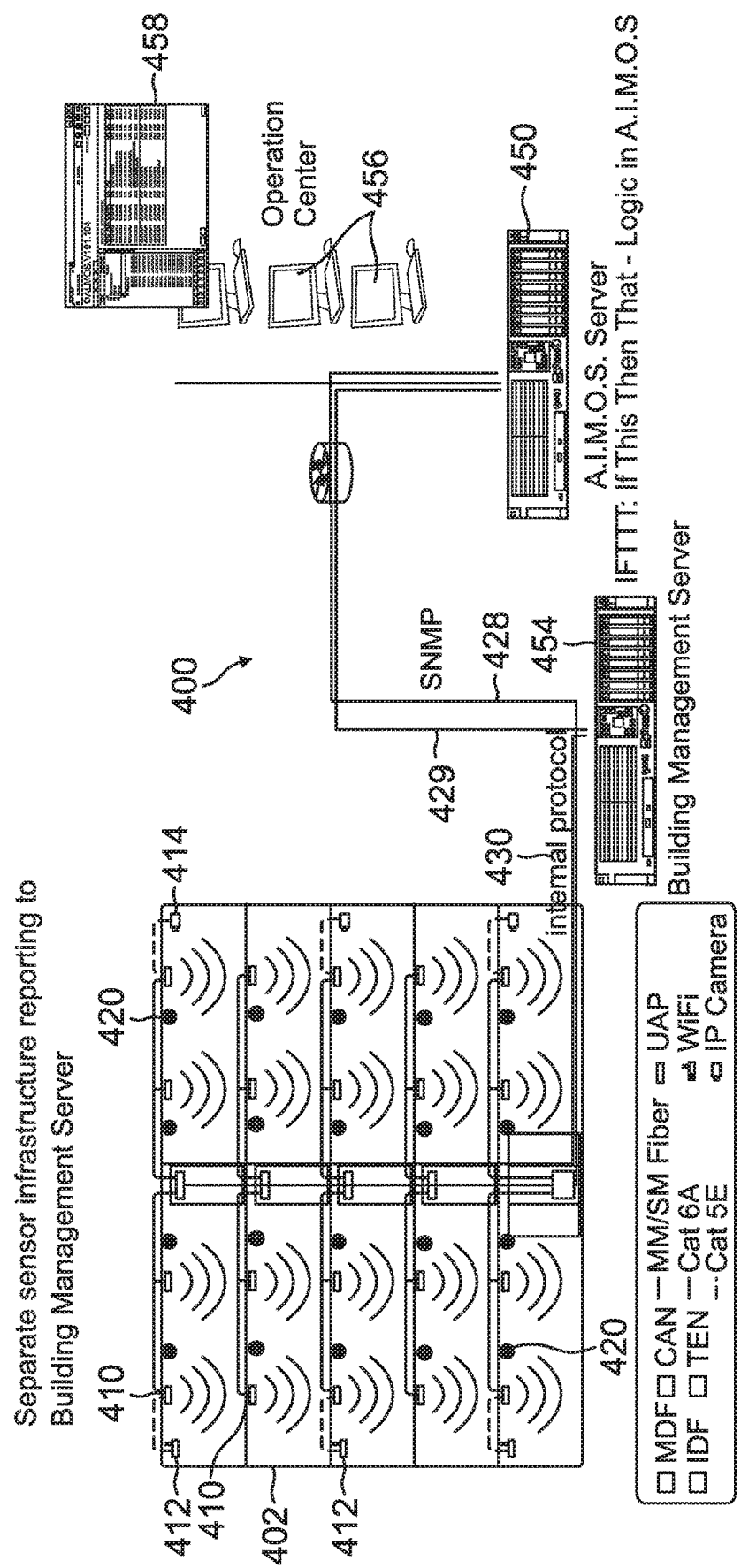
FIG. 4 illustrates one exemplary embodiment of a network management system for a distributed antenna system with multiple controllers.

FIG. 4 illustrates yet another example embodiment of a NMS 400 for a DAS. In this example embodiment, building sensors 420 are also not collocated with the communication components 410. In this example embodiment, the sensor data from the sensors 420 are provided to a building management server (BMS) 454 (building controller). Further the communication components 410 are in communication with server 450 via communication link 428. The BMS 454 is further in communication with server 450 via communication link 429. The sensors 420 of this embodiment also have a separate infrastructure that provides the sensor data to BMS 454. In the example embodiment, the sensor data is provided over communication link 430 to the BMS 454 via internet protocol. Other types of protocol may be used. For example, a priority protocol of the manufacture of building sensors and management infrastructures may be used. In other embodiments standardized protocols may be used. Moreover, embodiments may even employ wireless communications. In this embodiment, the NMS 400 does not directly collect the sensor data. In one embodiment, the BMS 454 is configured to generate alarms that are sent to the NMS server 450 via communication link 429. The NMS server 450 then triggers some RF reconfigurations based on received alarms from the BMS 454. The RF reconfiguration may be displayed in a screen 458 via work stations 456.

In another embodiment, the NMS server 450 has access to the sensor data of the BMS 454 and then applies logic (such as IFTTT logic) on the sensor data. Further in an embodiment, RF statistic data from communication components 410 such as a repeater or RU can be collected and combined with IOT sensor data by the NMS 400.

Figure 5:
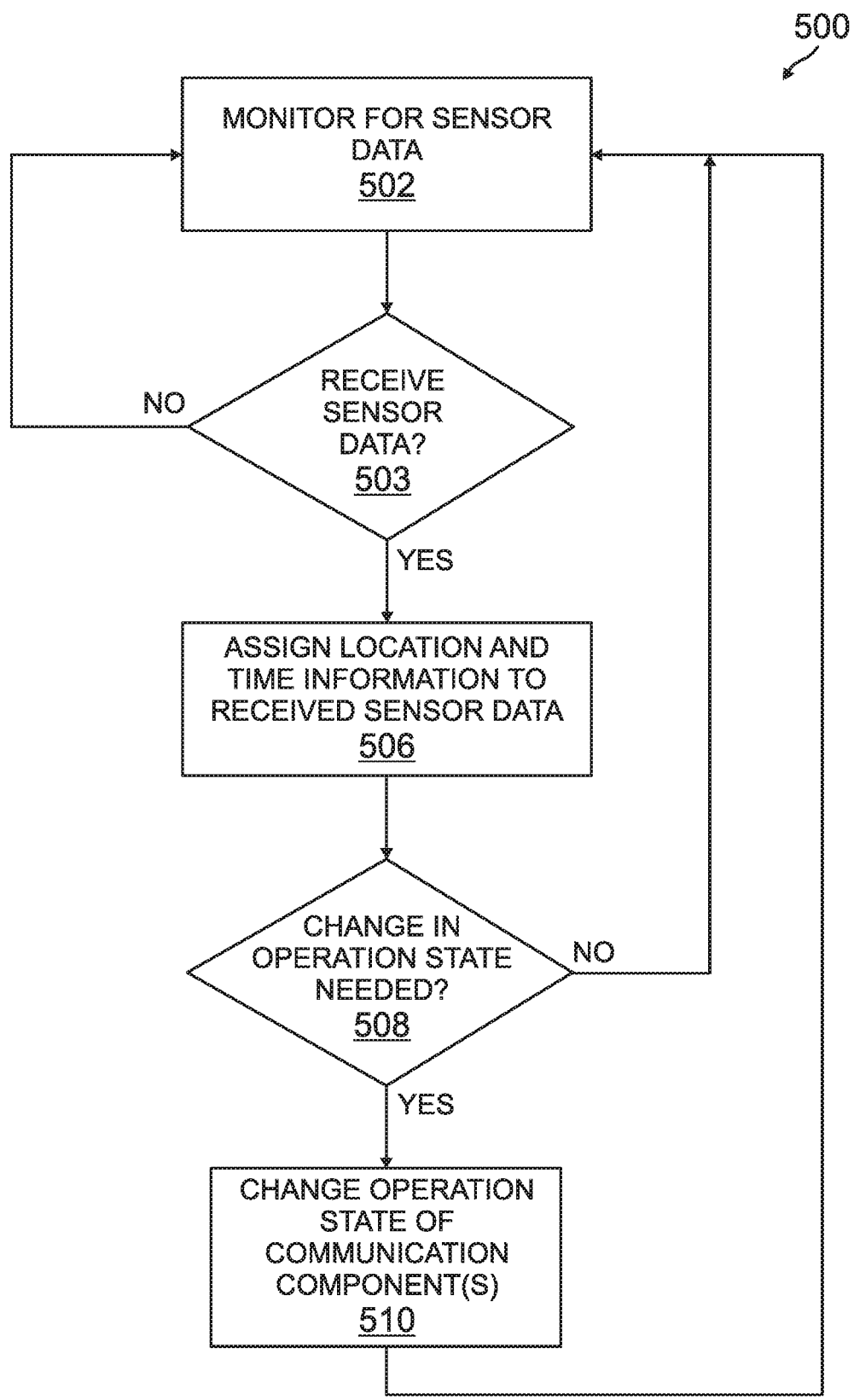
FIG. 5 illustrates one exemplary embodiment of a network management system method.

FIG. 5 illustrates an example of a NMS method 500. Method 500 comprises monitoring for the sensor data at a server or controller (block 502). As discussed above, the sensor data can be generated in embodiments by sensors collocated with communication components and/or sensors that are independent of the communication components, such as building sensors that are part of a building control management system. As discussed above, the sensor data can be communicated via one or more of the overhead channels provided over the transport cabling used in the DAS 100. For example, the sensor data can be communicated as pass through Ethernet or IP data. The sensor data can be communicated in other ways (for example, using proprietary protocols).

In an embodiment, sensor location information is attached to transmitted sensor data. If no sensor data is received (checked at block 503, the monitoring for sensor data continues (looping back to block 502). If sensor data is detected at step (checked in block 503), location and time information associated with the sensor data is captured (block 506). In one implementation of this embodiment, this is done the controller. By capturing location information of the sensor data, the controller can determine which communication component may be candidates for operation state adjustments. By capturing time information, events to be monitored that occur over a period of time can be tracked. For example, if a motion sensor does not detect any motion over a select period of time, communication component near the motion sensor may be turned off or put into a passive operating state so that high power consuming parts of the communication component go into a sleep mode. This type of determination can make use of sensor data and associated time information.

The method of FIG. 5 further comprises determining whether the sensor data requires that a change in at least one operation state of at least one communication component can be made (block 508). This is done by a controller implementing logic features in an embodiment. If the sensor data does not indicate that a change in the operation state can be made (block 508), the monitoring for sensor data continues (looping back to block 502). If the sensor data indicates requires a change in operation state of at least one communication component can be made (block 508), a change in the operation state of at least one communication component is made (block 510). After the change is made, the monitoring for sensor data continues (looping back to block 502). Examples of operation states of the communication component includes an inactive or sleep mode, an enabled or on mode, a redundant mode, a reduced output power mode, an output power in a downlink direction, an output power in an uplink direction, an on and off state, a mute state, an allocation of bandwidth, antenna direction, antenna directivity, antenna beam width, signal routing by analog relay switching and signal routing by digital signal switching etc. The reduced power mode may be used, for example, if there is only activity close to a remote antenna unit and the antenna detected.

Figure 6:
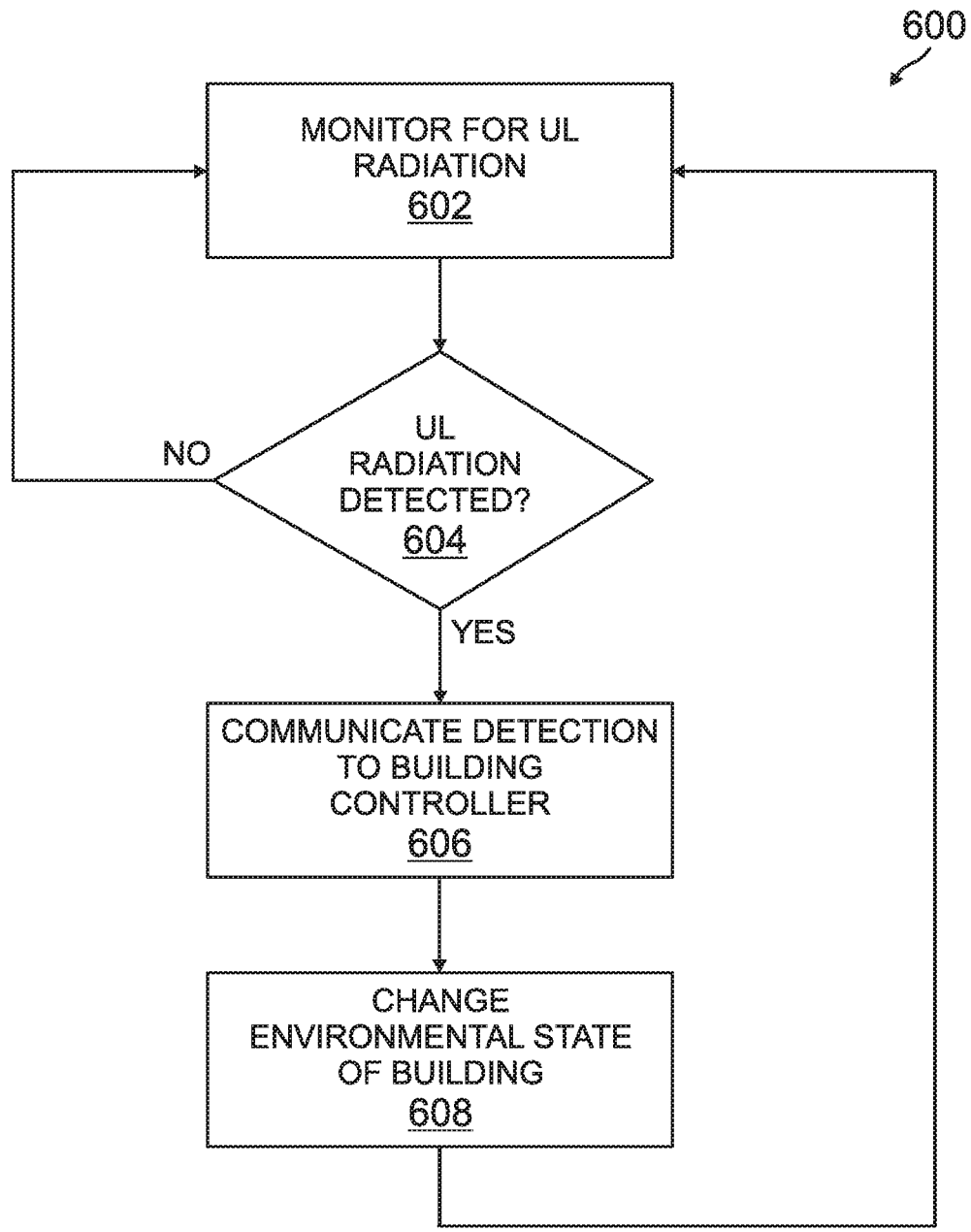
FIG. 6 illustrates one exemplary embodiment of a building environment control system method.

Referring to FIG. 6 an embodiment of a building environment control flow diagram 600 is illustrated. This example embodiment illustrates a system in which the DAS can be used to control the environment of the building 150. The process starts with components of the DAS, such as remote units and antennas, monitoring for uplink radiation at block (602). Uplink radiation indicates that user equipment 140 has entered an area of the building 150. If no uplink radiation is detected at block (604), the process continues at block (602) monitoring for uplink radiation.

If uplink radiation is detected at block (604), the DAS communicates the detection to the building controller at block (606). The DAS in embodiment provide location information so the building controller has information on where the uplink radiation is detected. Based on the information from the DAS, the building controller changes the environment in the building 150 at select locations. For example the building controller may turn on a light, air conditioning, heating etc. for a particular area indicated by the DAS as detecting uplink radiation. Because RF used in smart phones is a "medium range" signal which penetrates building walls and windows, the system can provide detection even when a person is entering a garage or outside parking place near the building. Hence, the environmental conditions within an area can be changed in preparation of a person entering an area with use of the DAS providing uplink radiation information to the building controller. This system can also be implemented in other areas besides buildings that use DAS that is in communication with a system controller.

EXAMPLE EMBODIMENTS

Example 1 is a communication component management system that includes at least one communication component, at least one building sensor and at least one controller. The at least one communication component is used to establish a communication link between user equipment within an area of a building and a distributed antenna system (DAS). The at least one building sensor is located to sense environmental conditions within the building as part of a building control management system. The at least one building sensor is positioned a select distance from the at least one communication component of the DAS. The at least one controller is in communication with the at least one communication component. The at least one controller is further communicatively coupled to receive sensor data from the at least one building sensor. The at least one controller is configured to selectively change an operation state of the at least one communication component based at least in part on received sensor data from the at least one building sensor.

Example 2 includes the communication component management system of Example 1 wherein the at least one building sensor is at least one of a light intensity sensor, image sensor, an audio sensor, a movement sensor, an acceleration sensor, a position sensor, smoke detector sensor, a fire detector sensor, a gunshot detector, a gas detector, a water sensor, a humidity sensor, temperature sensor, a pressure sensor, a radio sensor, a radio frequency sensor, a sensor for the detection of explosions, a sensor configured to sense aggressive behavior, a sensor configured to detect violent behavior and a sensor configured to detect panic.

Example 3 includes the communication component management system of any of the Examples 1-2, wherein the at least one controller further includes a building controller and a DAS communication controller. The building controller is in communication with the at least one building sensor to receive sensor data from the at least one building sensor. The DAS communication controller is in communication with the at least one communication component to control the operation state of the at least one communication component. The DAS controller is further in communication with the building controller to receive the sensor data from the at least one building sensor.

Example 4 includes the communication component management system of Example 3, wherein the building controller further includes at least one operator input configured to receive at least one of operator observed sensor data from the at least one sensor and operator observed conditions.

Example 5 includes the communication component management system of any of the Examples 3-4, wherein the building controller is in communication with at least one other building controller to receive sensor data associated with an area monitored by the at least one other building controller, the building controller configured to pass the sensor data associated with the area monitored by the at least one other building controller to the DAS communication controller.

Example 6 includes the communication component management system of any of the Examples 1-5, further including at least one collocated sensor that is positioned within the at least one communication component. The at least one controller is communicatively coupled to receive sensor data from the at least one collocated sensor. The at least one controller is configured to selectively change an operation state of the at least one communication component based at least in part on received sensor data from the at least one collocated sensor.

Example 7 the communication component management system of Example 6, wherein the at least one controller is configured to use a first protocol in communications with the at least one building sensors and a second protocol in communications with the at least one collocated sensor.

Example 8 includes the communication component management system of Example 6, wherein the at least one controller further includes a building controller and a DAS communication controller. The building controller is in communication with the at least one building sensor to receive sensor data from the at least one building sensor. The DAS communication controller is in communication with the at least one communication controller to control the operation state of the at least one communication controller. The DAS controller is further in communication with the building controller to receive the sensor data from the at least one building sensor.

Example 9 includes the communication component management system of Example 8, wherein the building controller includes at least one operator input configured to receive at least one of operator observed sensor data from the at least one sensor and operator observed conditions.

Example 10 includes the communication component management system of any of the Examples 1-9, further including at least one input/output device in communication with the at least one controller.

Example 11, includes the communication component management system of any of the Examples 1-10, wherein the at least one communication component includes at least one of a remote antenna unit, an antenna, expansion unit, a WiFi access point, a small cell base station, an antenna array, repeater, relay for analog switching, digital switch for digital switching a digital signal transport, antenna manipulation components for direction, directivity and beam width control for antenna and antenna arrays.

Example 12 includes the communication component management system of any of the Examples 1-11, further including at least one memory to store the sensor data and operating features implemented by the at least one controller.

Example 13 is a distributed antenna system (DAS) having a communication component management system, the DAS includes at least one base station, at least one master unit, a plurality of communication components, a plurality of building sensors and at least one controller. The at least one base station is in communication with a service provider network. The at least one master unit is in communication with the at least one base station to at least in part route communication signals. Each communication component is positioned to provide communication services to a select coverage area within a building. The plurality of communication components are in communication with the at least one master unit. Each building sensor is positioned to generate sensor data relating to a select sensor area of the building as part of a building control management system. The at least one controller is in communication with the plurality of communication components. The at least one controller is further communicatively coupled to receive sensor data from the plurality of building sensors. The at least one controller is configured to selectively change an operation state of at least one of the plurality of communication components based at least in part on received sensor data from at least one of the building sensors.

Example 14 includes the DAS of Example 13, wherein the at least one controller further includes a building controller and a DAS communication controller. The building controller is in communication with each of the plurality of building sensors to receive sensor data from each of the plurality of building sensors. The DAS communication controller is in communication with each of the plurality of communication components to control the operation state of each communication component. The DAS controller is further in communication with the building controller to receive the sensor data from the at least one building sensor.

Example 15 includes the DAS of any of the Examples 13-14, further including a collocated sensor positioned within at least one communication component of the plurality of communication components. The at least one controller is communicatively coupled to receive sensor data from the collocated sensor. The at least one controller is configured to selectively change an operation state of at least one communication component of the plurality of communication components based at least in part on received sensor data from at least one collocated sensor.

Example 16 includes the DAS of Example 15, wherein the at least one controller is configured to use a first protocol in communication with the plurality of building sensors and a second protocol when communicating with the collocated sensors.

Example 17 includes the DAS of Example 15, wherein at least one building sensor and collocated sensor is one of a light intensity sensor, image sensor, an audio sensor, a movement sensor, an acceleration sensor, a positon sensor, smoke detector sensor and a fire detector sensor, a gunshot detector, a gas detector, a water sensor, a humidity sensor, temperature sensor, a pressure sensor, a radio sensor, a radio frequency sensor, a sensor for the detection of explosions, a sensor configured to sense aggressive behavior, a sensor configured to detect violent behavior and a sensor configured to detect panic.

Example 18 includes a method of managing reconfigurable components in a distributed antenna system (DAS). The method includes receiving sensor data from at least one building sensor that is part of a building control management system that is positioned to sense environmental conditions within a select area of a building. It is determined if the sensor data from the at least one building sensor requires a change in an operating state of at least one communication component providing communication services to the select area of the building is needed. When a change of operation of at least one communication component is determined, the operating state of the at least one communication component providing communication services to the select area of the building is changed.

Example 19 includes the method of Example 18, wherein the received sensor data is from at least one of a light intensity sensor, image sensor, an audio sensor, a movement sensor, an acceleration sensor, a position sensor, smoke detector sensor and a fire detector sensor, a gunshot detector, a gas detector, a water sensor, a humidity sensor, temperature sensor, a pressure sensor, a radio sensor, a radio frequency sensor, a sensor for the detection of explosions, a sensor configured to sense aggressive behavior, a sensor configured to detect violent behavior and a sensor configured to detect panic.

Example 20 includes the method of any of the Examples 18-19, further including receiving sensor data from at least one collocated sensor that is collocated with an associated communication component and determining if the sensor data from the at least one collocated sensor requires a change in an operating state of at least one communication component providing communication coverage services to the select area of the building is needed.

Example 21 includes the method of any of the Examples 18-20, wherein changing the operating state of the at least one communication component includes one of switching the at least one communication component into a sleep mode, switching the at least one communication component into an enabled mode, switching the at least one communication component into a redundant mode and switching the at least one communication component into a reduce output power mode.

Example 22 includes the method of any of the Examples 18-21, wherein changing the operating state of the at least one communication component includes controlling at least one of an output power in a downlink direction, an output power in an uplink direction, an on and off state, a mute state, an allocation of bandwidth, antenna direction, antenna directivity, antenna beam width and signal routing.

Example 23 includes the method of any of the Examples 18-22, further including assigning at least one of location information and time information to the received sensor data. The at least one of location and time information is used in determining if the sensor data from the at least one collocated sensor requires a change in an operating state of at least one communication component.

Example 24 includes the method of any of the Examples 18-23, further including assigning to the received sensor data historic sensor data information associated with a sensor generating the sensor data; and using the historic data information in determining if a change in an operating state of at least one communication component is needed Example 25 includes the method of any of the Examples 18-24, further including communicating the received sensor data from the at least one building sensor between a building management controller to at least one communication controller of the DAS.

Example 26 is a method of controlling environmental states in an area. The method includes monitoring for uplink radiation with a distributed antenna system (DAS). Upon detection of uplink radiation in an area covered by the DAS, Detection and location information is communicated to a building controller that controls environmental conditions associated with the area covered by the DAS. The environmental conditions associated with the area is controlled with the building controller based on the communicated detection and location information.

Example 27 includes the method of Example 26, wherein the environmental conditions include at least one of lighting, heating, cooling, terror attacks, detection of explosives, panic of crowds, gun shots, fire, flooding, time, and intensity of uplink radio signals from user equipment, a sensor configured to sense aggressive behavior, a sensor configured to detect violent behavior and a sensor configured to detect panic.

Example 28 includes the method of any of the Examples 26-27, further including managing reconfigurable communication components of the DAS by; receiving sensor data from at least one building sensor that is part of a building control management system that is positioned to sense environmental conditions within a select area of a building; determining if the sensor data from the at least one building sensor requires a change in an operating state of at least one communication component providing communication services to the select area of the building is needed; and when a change of operation of at least one communication component is determined, changing the operating state of the at least one communication component providing communication services to the select area of the building.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A communication component management system comprising:
   at least one communication component used to establish a communication link between user equipment within a select area of a building and a distributed antenna system (DAS), the at least one communication component configured to monitor uplink radiation from the user equipment within the area of the building; and
   a DAS communication controller in communication with the at least one communication component to control the operation state of the at least one communication component, the DAS communication controller further in communication with a building system controller that is configured to control plurality of building systems based on received sensor data from a plurality of building sensors wherein at least one building sensor of the plurality of building sensors is a different type of building sensor than another building sensor of the plurality of building sensors, wherein the DAS communication controller is configured to selectively change an operation state of the at least one communication component based at least in part on received sensor data from the building system controller, the DAS communication controller is further configured to provide location information associated with detected uplink radiation from the user equipment to the building sensor controller.

2. The communication component management system of claim 1, wherein the plurality of building sensors include least one of a light intensity sensor, image sensor, an audio sensor, a movement sensor, an acceleration sensor, a position sensor, smoke detector sensor, a fire detector sensor, a gunshot detector, a gas detector, a water sensor, a humidity sensor, a temperature sensor, a pressure sensor, a radio sensor, a radio frequency sensor, a sensor for the detection of explosions, a sensor configured to sense aggressive behavior, a sensor configured to detect violent behavior and a sensor configured to detect panic.

3. The communication component management system of claim 1, wherein the building system controller further comprises:
   at least one operator input configured to receive at least one of operator observed sensor data from the at least one sensor and operator observed conditions.

4. The communication component management system of claim 1, wherein the building system controller is in communication with at least one other building controller to receive sensor data associated with an area monitored by the at least one other building controller, the building system controller configured to pass the sensor data associated with the area monitored by the at least one other building controller to the DAS communication controller.

5. The communication component management system of claim 1, further comprising:
   at least one collocated sensor positioned within the at least one communication component, the DAS communication controller communicatively coupled to receive sensor data from the at least one collocated sensor, the DAS communication controller configured to selectively change an operation state of the at least one communication component based at least in part on received sensor data from the at least one collocated sensor.

6. The communication component management system of claim 5, wherein the DAS communication controller is configured to use a first protocol in communications with the at least one building sensors and a second protocol in communications with the at least one collocated sensor.

7. The communication component management system of claim 5, wherein
   the building system controller includes at least one operator input configured to receive at least one of operator observed sensor data from the at least one sensor and operator observed conditions.

8. The communication component management system of claim 1, further comprising:
   at least one input/output device to allow a technician to modify the communication component management system when needed.

9. The communication component management system of claim 1, wherein in the at least communication component includes at least one of a remote antenna unit, an antenna, expansion unit, a WiFi access point, a small cell base station, an antenna array, repeater, relay for analog switching, digital switch for digital switching a digital signal transport, antenna manipulation components for direction, directivity and beam width control for antenna and antenna arrays.

10. The communication component management system of claim 1, further comprising:
at least one memory to store the sensor data and operating features implemented by the at least one controller.

11. A distributed antenna system (DAS) having a communication component management system, the DAS comprising:
at least one base station in communication with a service provider network;
at least one master unit in communication with the at least one base station to at least in part route communication signals;
a plurality of communication components, each communication component positioned to provide communication services to a select coverage area within a building, the plurality of communication components in communication with the at least one master unit), each communication component configured to monitor uplink radiation from user equipment within the associated select coverage area within the building;
a DAS communication controller in communication with the plurality of communication components to control the operation state of each communication component, the DAS communication controller further in communication with a building system controller that is configured to control a plurality of building systems based on received sensor data from a plurality of building sensors, wherein at least one building sensor of the plurality of building sensors is a different type of building sensor than another building sensor of the plurality of building sensors, wherein the DAS communication controller is configured to selectively change an operation state of at least one of the plurality of communication components based at least in part on received sensor data from the communication with the building system controller, the DAS further configured to provide location information associated with detected uplink radiation from the user equipment to the building sensor controller.

12. The DAS of claim 11, further comprising:
a collocated sensor positioned within at least one communication component of the plurality of communication components, the DAS communication controller communicatively coupled to receive sensor data from the collocated sensor, the DAS communication controller configured to selectively change an operation state of at least one communication component of the plurality of communication components based at least in part on received sensor data from at least one collocated sensor.

13. The DAS of claim 12, wherein the DAS communication controller is configured to use a first protocol in communication with the plurality of building sensors and a second protocol when communicating with the collocated sensors.

14. The DAS of claim 12, wherein at least one building sensor and collocated sensor is one of a light intensity sensor, image sensor, an audio sensor, a movement sensor, an acceleration sensor, a position sensor, smoke detector sensor, a fire detector sensor, a gunshot detector, a gas detector, a water sensor, a humidity sensor, temperature sensor, a pressure sensor, a radio sensor, a radio frequency sensor, a sensor for the detection of explosions, a sensor configured to sense aggressive behavior, a sensor configured to detect violent behavior and a sensor configured to detect panic.

15. A method of managing reconfigurable communication components in a distributed antenna system (DAS), the method comprising:
receiving from a building control management system sensor data, the building control management system obtaining the sensor data from a plurality of building sensors that are positioned to sense environmental conditions within a select area of a building, wherein the building control management system controls plurality of building systems within the select area of the building based on the sensor data from the plurality of the building sensors, at least one of the building sensor of the plurality of building sensors being a different type of sensor than another sensor of the plurality of sensors;
determining if the sensor data from the building control management system indicates a change in an operating state of at least one communication component providing communication services to the select area of the building is needed;
when a change of operation of at least one communication component is determined, changing the operating state of the at least one communication component providing communication services to the select area of the building;
monitoring for uplink radiation from user equipment with a distributed antenna system (DAS); and
controlling the environmental conditions with the building controller based on the communicated detection and location information of the uplink radiation from the user equipment.

16. The method of claim 15, wherein the obtained sensor data from the plurality of the building sensors is from at least one of a light intensity sensor, image sensor, an audio sensor, a movement sensor, an acceleration sensor, a position sensor, smoke detector sensor and a fire detector sensor, a gunshot detector, a gas detector, a water sensor, a humidity sensor, temperature sensor, a pressure sensor, a radio sensor, a radio frequency sensor, a sensor for the detection of explosions, a sensor configured to sense aggressive behavior, a sensor configured to detect violent behavior and a sensor configured to detect panic.

17. The method of claim 15, further comprising:
receiving sensor data from at least one collocated sensor that is collocated with an associated communication component; and
determining if the sensor data from the at least one collocated sensor requires a change in an operating state of at least one communication component providing communication services to the select area of the building is needed.

18. The method of claim 15, wherein changing the operating state of the at least one communication component includes at least one of switching the at least one communication component into a sleep mode, switching the at least one communication component into an enabled mode, switching the at least one communication component into a redundant mode and switching the at least one communication component into a reduce output power mode.

19. The method of claim 15, wherein changing the operating state of the at least one communication component includes controlling at least one of an output power in a downlink direction, an output power in an uplink direction, an on and off state, a mute state, an allocation of bandwidth, antenna direction, antenna directivity, antenna beam width and signal routing.

20. The method of claim 15, further comprising:
assigning at least one of location information and time information to the received sensor data; and
using the at least one of location and time information in determining if the sensor data from the at least one building sensor requires a change in an operating state of at least one communication component.

21. The method of claim 15, further comprising:
assigning to the received sensor data historic sensor data information associated with a sensor generating the sensor data; and
using the historic data information in determining if a change in an operating state of at least one communication component is needed.

22. The method of claim 15, further comprising:
communicating the received sensor data from the building management controller to at least one communication controller of the DAS.

23. A method of controlling environmental states in an area, the method comprising:
monitoring for uplink radiation from user equipment with a distributed antenna system (DAS);
upon detection of uplink radiation in an area covered by the DAS, communicating detection and location information to a building controller that controls building systems that control environmental conditions associated with the area covered by the DAS; and
controlling the environmental conditions with the building controller based on the communicated detection and location information of the uplink radiation from the user equipment.

24. The method of claim 23, wherein the environmental conditions controlled by the building systems include at least one of lighting, heating, and cooling.

25. The method of claim 23, further comprising:
managing reconfigurable communication components of the DAS by;
receiving sensor data from at least one building sensor that is part of a building control management system that is positioned to sense environmental conditions within a select area of a building;
determining if the sensor data from the at least one building sensor requires a change in an operating state of at least one communication component providing communication services to the select area of the building is needed; and
when a change of operation of at least one communication component is determined, changing the operating state of the at least one communication component providing communication services to the select area of the building.

* * * * *